(12) United States Patent
Tang (10) Patent No.: US 11,734,349 B2
(45) Date of Patent: Aug. 22, 2023

(54) CONVERGENCE INFORMATION-TAGS RETRIEVAL METHOD

(71) Applicant: Chih-Pin Tang, New Taipei (TW)

(72) Inventor: Chih-Pin Tang, New Taipei (TW)

( * ) Notice: Subject to any disclaimer, the term of this patent is extended or adjusted under 35 U.S.C. 154(b) by 343 days.

(21) Appl. No.: 17/077,248

(22) Filed: Oct. 22, 2020

(65) Prior Publication Data

US 2021/0124778 A1  Apr. 29, 2021

Related U.S. Application Data

(60) Provisional application No. 62/924,718, filed on Oct. 23, 2019.

(30) Foreign Application Priority Data

Oct. 12, 2020  (TW) .................................. 109135247

(51) Int. Cl.
| | | |
|---|---|---|
| *G06F 16/90* | (2019.01) | |
| *G06F 16/901* | (2019.01) | |
| *G06F 16/908* | (2019.01) | |
| *G06F 16/9038* | (2019.01) | |
| *G06F 16/9035* | (2019.01) | |

(52) U.S. Cl.
CPC .......... *G06F 16/901* (2019.01); *G06F 16/908* (2019.01); *G06F 16/9035* (2019.01); *G06F 16/9038* (2019.01)

(58) Field of Classification Search
CPC ...................................................... G06F 16/90
USPC ........................................................ 707/805
See application file for complete search history.

(56) References Cited

U.S. PATENT DOCUMENTS

| | | | | |
|---|---|---|---|---|
| 5,924,096 A | * | 7/1999 | Draper ..................... | G06F 16/27 |
| 6,510,434 B1 | * | 1/2003 | Anderson ............... | G06F 16/30 |
| | | | | 715/236 |
| 7,703,040 B2 | * | 4/2010 | Cutrell .............. | G06F 16/90324 |
| | | | | 707/E17.135 |
| 8,224,851 B2 | * | 7/2012 | Banda ................... | G06F 16/907 |
| | | | | 715/741 |
| 9,449,080 B1 | * | 9/2016 | Zhang ................. | G06F 16/3346 |

(Continued)

FOREIGN PATENT DOCUMENTS

| | | |
|---|---|---|
| CN | 200419390 A | 10/2004 |
| CN | 104516979 A | 4/2015 |
| CN | 106528612 A | 3/2017 |

*Primary Examiner* — Syling Yen
(74) *Attorney, Agent, or Firm* — McClure, Qualey & Rodack, LLP (57) ABSTRACT

An information retrieval method is provided, applicable to a database. The database includes a plurality of pieces of information and a plurality of index tags, and each of the pieces of information is associated with at least one of the index tags. The information retrieval method includes: receiving a piece of retrieval information; extracting pieces of first information associated with the retrieval information from the pieces of information of the database; extracting a plurality of first index tags corresponding to the pieces of first information from the index tags; requesting a display field of a first index tag to be adjacent to or located in a display field or display page of first information corresponding to the first index tag; receiving a filter tag selected from the first index tags; and extracting pieces of second information associated with the filter tag from the pieces of first information.

11 Claims, 11 Drawing Sheets

(56) References Cited

U.S. PATENT DOCUMENTS

| | | | | |
|---|---|---|---|---|
| 10,146,751 | B1* | 12/2018 | Zhang | G06F 16/313 |
| 2007/0005576 | A1* | 1/2007 | Cutrell | G06F 16/90324 |
| | | | | 707/E17.14 |
| 2008/0003964 | A1* | 1/2008 | Alperin | H04M 3/5233 |
| | | | | 455/185.1 |
| 2008/0104032 | A1* | 5/2008 | Sarkar | G06F 16/958 |
| | | | | 707/999.102 |
| 2008/0201302 | A1* | 8/2008 | Kimchi | G06F 16/29 |
| 2008/0270381 | A1* | 10/2008 | Thomsen | G06F 16/2471 |
| | | | | 707/999.005 |
| 2010/0131899 | A1* | 5/2010 | Hubert | G06F 16/86 |
| | | | | 715/825 |
| 2012/0030244 | A1* | 2/2012 | John | G06F 16/958 |
| | | | | 707/E17.143 |
| 2013/0145255 | A1* | 6/2013 | Zheng | G06F 16/986 |
| | | | | 715/234 |
| 2013/0268544 | A1* | 10/2013 | Nikankin | G06F 16/313 |
| | | | | 707/754 |
| 2014/0337373 | A1* | 11/2014 | Morsi | G06F 16/245 |
| | | | | 707/769 |
| 2016/0179416 | A1* | 6/2016 | Mutha | G06F 3/065 |
| | | | | 711/162 |
| 2016/0267147 | A1* | 9/2016 | Seemann | G06F 16/248 |
| 2016/0283564 | A1* | 9/2016 | Sharon | G06F 16/2453 |
| 2017/0220582 | A1* | 8/2017 | McCann | G06F 16/9535 |
| 2017/0300531 | A1* | 10/2017 | Poovananathan | G06F 16/248 |
| 2019/0138639 | A1 | 5/2019 | Arindam et al. | |
| 2020/0125575 | A1* | 4/2020 | Ghoshal | G06F 40/247 |
| 2021/0034657 | A1* | 2/2021 | Kale | G06K 9/6223 |
| 2021/0124778 | A1* | 4/2021 | Tang | G06F 16/908 |
| 2022/0035775 | A1* | 2/2022 | Sriharsha | G06K 9/6231 |
| 2022/0100791 | A1* | 3/2022 | Kale | G06F 16/24578 |

\* cited by examiner

|  | A | B | C | D |
|---|---|---|---|---|
| Info1 | √ | √ | √ |  |
| Info2 |  | √ |  | √ |
| Info3 | √ | √ | √ | √ |
| Info4 | √ |  | √ |  |
| Info5 |  | √ | √ | √ |
| Info6 | √ | √ |  |  |
| Info7 | √ |  |  |  |

| Index tag<br>Information | A | B | C | D |
|---|---|---|---|---|
| Info1 | √ | √ | √ | |
| Info2 | | √ | | √ |
| Info3 | √ | √ | √ | √ |
| Info4 | √ | | √ | |
| Info5 | | √ | √ | √ |
| Info6 | √ | √ | | |
| Info7 | √ | | | |

| Index tag<br>Information | A | B | C | D |
|---|---|---|---|---|
| Info1 | √ | √ | √ | |
| Info2 | | √ | | √ |
| Info3 | √ | √ | √ | √ |
| Info4 | √ | | √ | |
| Info5 | | √ | √ | √ |
| Info6 | √ | √ | | |
| Info7 | √ | | | |

CONVERGENCE INFORMATION-TAGS RETRIEVAL METHOD

CROSS-REFERENCES TO RELATED APPLICATIONS

This application claims the benefit of U.S. provisional application Ser. No. 62/924,718, filed on Oct. 23, 2019 and claims the priority of Patent Application 109135247 filed in Taiwan, R.O.C. on Oct. 12, 2020. The entirety of the above-mentioned patent applications are hereby incorporated by references herein and made a part of the specification.

BACKGROUND

Technical Field

The present invention relates to an information retrieval method.

Related Art

An objective of information retrieval is to quickly and accurately provide a solution to a problem to a user. One of conventional information retrieval manners is that after user uses a first keyword to retrieve information, the user gets a plurality of pieces of first information relating to the first keyword and hot keywords corresponding to the pieces of first information. So the user can re-search through the hot keywords to obtain a new search result. The user can retrieve different pieces of first information through trying different keywords, and a desired result could be found from the pieces of first information. However, in the conventional information retrieval manner, further information filtering cannot be performed based on the current result of the obtained first information.

Some other conventional information retrieval manners not only provide the user with a plurality of pieces of first information in a specific region of a display screen but also prompt the user about second keywords relating to the first information that the second keywords may be provided to the user to further filter the current first information. However, all of the second keywords are collectively displayed in the specific region of the display screen. When reviewing the second keywords located in the specific region, the user cannot explicitly learn first information with which a specific second keyword is associated. In other words, when reviewing the first information one by one, the user cannot learn a second keyword with which the first information is further associated either. In this way, a generated problem is that, when the user is interested in a piece of first information and intends to further find precise results from the pieces of first information currently found. The user needs to guess one or more second keywords with which the first information is likely to be associated collectively displayed in the specific region of the display screen.

SUMMARY

In view of this, the applicant provides an information retrieval method. According to some embodiments, an information retrieval method is applicable to a database, where the database includes a plurality of pieces of information and a plurality of index tags, each of the pieces of information is associated with at least one of the index tags, and the information retrieval method includes: receiving a piece of retrieval information; determining an index tag associated with the retrieval information, where the associated index tag is a first filter tag; extracting a plurality of pieces of first information associated with the first filter tag from the pieces of information of the database, where the pieces of first information form a first information set; extracting a plurality of first index tags corresponding to the pieces of first information from the index tags, where the first index tags form a first index tag set; defining a first index tag sub-set, where the first index tag sub-set does not include the first filter tag; displaying the pieces of first information; displaying the first index tag sub-sets, where a display field of each of the first index tag sub-sets is adjacent to or located in a display field or display page of first information corresponding to the first index tag sub-set; receiving a second filter tag, where the second filter tag is selected from any first index tag in the first index tag sub-set; and extracting a plurality of pieces of second information associated with the second filter tag from the pieces of first information of the first information set, where the pieces of second information form a second information set.

To sum up, according to some embodiments, for all pieces of first information, first index tag sub-sets are separately displayed on each of the pieces of first information or locations near each of the pieces of first information, and each of the pieces of first information only displays the first index tag sub-set which associated with it for the user. The user may further use the first index tag related to a piece of first information in which the user is interested, to retrieve detailed information.

DETAILED DESCRIPTION

Figure 1:
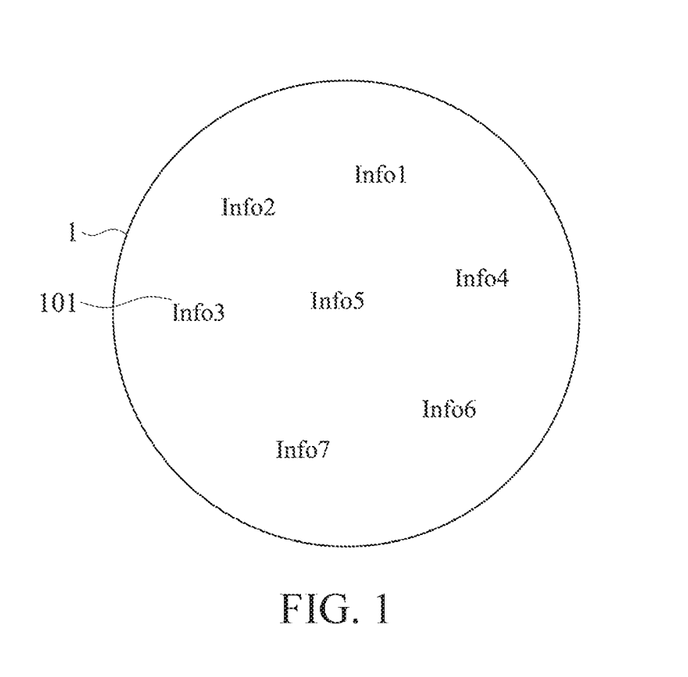
FIG. 1 is a schematic diagram of a database according to some embodiments.

An information retrieval method is applicable to a database 1. According to some embodiments, the information retrieval method is performed in a server, and the server may read data of the database 1 from a memory. According to some embodiments, the server receives input of retrieval information 2 through a peripheral control interface such as a keyboard or a mouse. According to some embodiments, the server receives input of the retrieval information 2 through a network. The database 1 includes a plurality of pieces of information 101. The pieces of information 101 may be, but not limited to, data such as a text or a picture. Referring to FIG. 1, FIG. 1 is a schematic diagram of a database according to some embodiments. For example, the database 1 includes a plurality of pieces of information 101 such as Info 1, Info 2 to Info 7.

Figure 2:
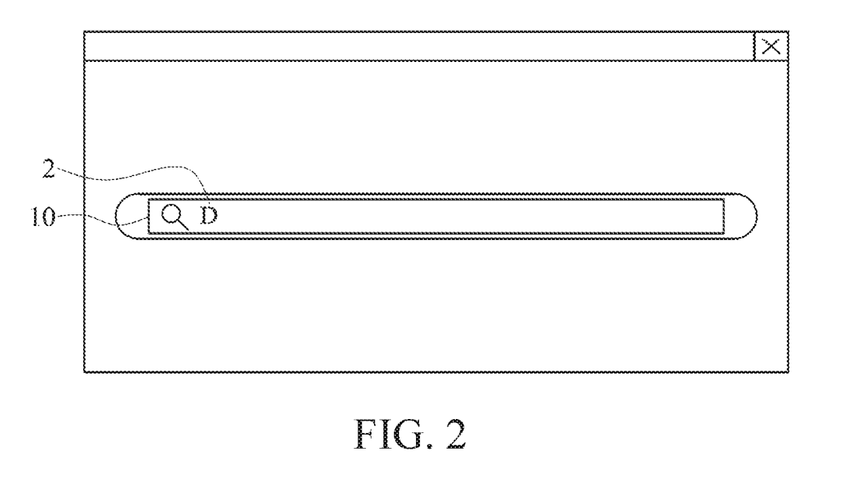
FIG. 2 is a schematic diagram of a retrieval page according to some embodiments.
Figure 3:
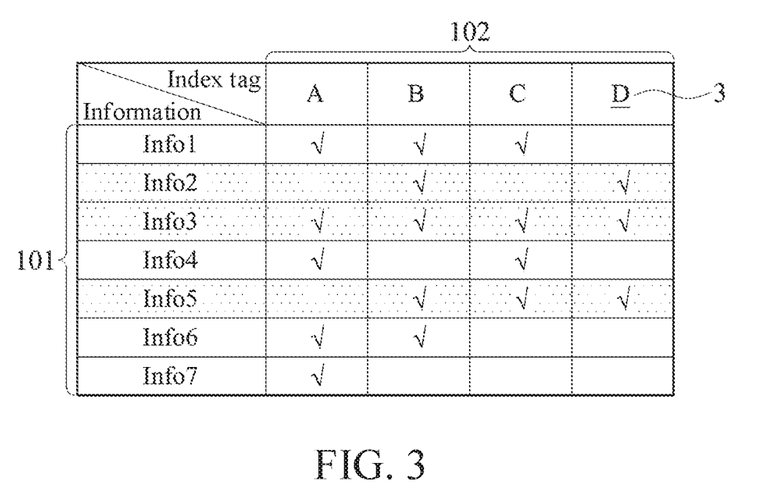
FIG. 3 is an information relationship diagram of a database according to some embodiments.

After retrieval information 2 provided by a user is received, in the information retrieval method, an index tag 102 associated with the retrieval information 2 is determined and defined as a first filter tag 3. The retrieval information 2 may be, but not limited to, data such as a text or a picture. The index tag 102 may be, but not limited to, data such as a text or a picture. According to some embodiments, the retrieval information 2 is substantially the same as the index tag 102. According to some embodiments, the retrieval information 2 is different from but has an association with the index tag 102. The association may be established in, but not limited to, a manner of information meaning, information co-occurrence frequency or user preference survey. According to some embodiments, the user selects at least one piece of retrieval information 2 from a preset list of retrieval information 2; and in the information retrieval method, retrieval information 2 is received, and an index tag 102 associated with the retrieval information 2 is determined. According to some embodiments, the user enters retrieval information 2 with a statement, and in the information retrieval method, an index tag 102 associated with the statement is determined through an algorithm. The first filter tag 3 is the index tag 102 associated with the retrieval information 2, and is used for retrieving the information 101 in the database 1. Referring to FIG. 2 and FIG. 3 together, FIG. 2 is a schematic diagram of a retrieval page according to some embodiments; FIG. 3 is an information relationship diagram of a database according to some embodiments. For example, after a user enters retrieval information 2 of a keyword D to a retrieval field 10, "D" of an index tag 102 associated with the retrieval information 2, that is, in the information retrieval method, "D" of the index tag 102 shown in FIG. 3 is determined and is defined as a first filter tag 3.

Figure 4:
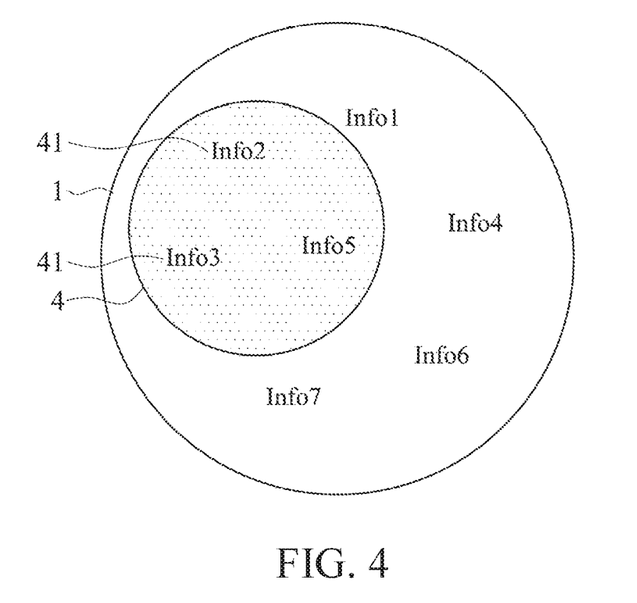
FIG. 4 is a schematic diagram of a first information set according to some embodiments.

Pieces of information 101 of the database 1 are associated with at least one index tag 102. Referring to FIG. 3, for example, Info 1 of the information 101 is associated with "A", "B" and "C" of the index tag 102. In the information retrieval method, a plurality of pieces of information 101 associated with a first filter tag 3 in the database 1 are extracted. All of the pieces of information 101 extracted with the first filter tag 3 in the information retrieval method are defined as pieces of first information 41, and the pieces of first information 41 jointly form a first information set 4. Referring to FIG. 3 and FIG. 4 together, FIG. 4 is a schematic diagram of a first information set according to some embodiments. For example, the first filter tag 3 "D" corresponds to Info 2, Info 3, and Info 5 of the information 101. Pieces of information 101 such as Info 2, Info 3, and Info 5 are extracted in the information retrieval method, and all of the pieces of information 101 are pieces of first information 41 and jointly form a first information set 4.

In the information retrieval method, a plurality of index tags 102 respectively corresponding to pieces of first information 41 are extracted from the index tags 102. All of the extracted index tags 102 are first index tags 511, and the first index tags 511 jointly form a first index tag set. A first index tag sub-set 51 is defined in the information retrieval method, where the first index tag sub-set 51 does not include the first filter tag 3, which is included in the first index tag set. Referring to FIG. 3, in the foregoing example, Info 2 of the first information 41 corresponds to "B" and "D" of the index tag 102; Info 3 of the first information 41 corresponds to "A", "B", "C", and "D" of the index tag 102; and Info 5 of the first information 41 corresponds to "B", "C", and "D" of the index tag 102. Therefore, for Info 2 of the first information 41, both "B" and "D" of the index tag 102 are first index tags 511 corresponding to the first information, and "B" and "D" jointly form a first index tag set. "D" of the first index tag 511 is the first filter tag 3, that is, the index tag 102 used for filtering out the first information 41. Therefore, "D" of the first index tag 511 is undoubtedly a common index tag 102 of all pieces of first information 41. In other words, "D" of the first index tag 511 is unhelpful in further filtering the first information 41. Therefore, a first index tag sub-set 51 not including the first filter tag 3 is defined in the information retrieval method. For example, the first index tag set of Info 5 of the first information 41 is "B", "C", and "D", while the first index tag sub-set 51 is "B" and "C". According to some embodiments, in the information retrieval method, only index tags 102 that are associated with the pieces of first information 41 and that are not the first filter tag 3 are extracted, to obtain the first index tag sub-set 51. According to some embodiments, in the information retrieval method, index tags 102 that are associated with the pieces of first information 41 are extracted and then the first filter tag 3 is removed, to obtain the first index tag sub-set 51.

Figure 5:
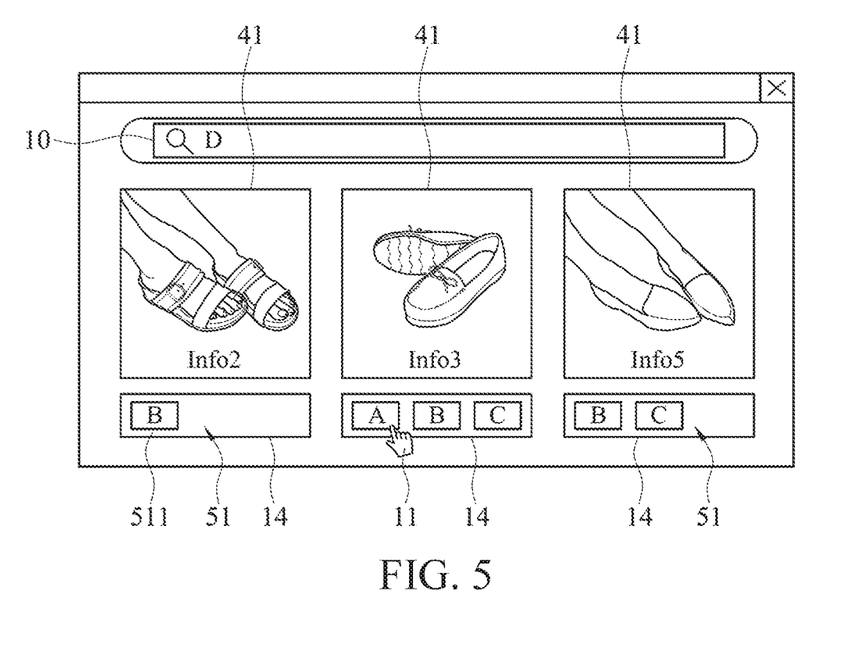
FIG. 5 is a schematic diagram of a retrieval result page according to some embodiments.

The pieces of first information 41 are displayed in the information retrieval method, and the first index tag sub-sets 51 are displayed in the information retrieval method. According to some embodiments, "display" may be to transmit a display instruction, and the display instruction requests a display screen to perform display. According to some embodiments, the display instruction may be an internal control instruction of a server, and the display instruction requests a display screen connected to the server through a control interface to perform display. According to some embodiments, the display instruction may be a control instruction transmitted outward by a server, and the display instruction requests a display screen of a user side connected to the server through a network to perform display. According to some embodiments, the display instruction may include messages such as a display content and a display field. The display content may be, but not limited to, the first information 41 or the first index tag sub-set 51. The display field may be, but not limited to, a field coordinate or paged page 13 displayed on a display. Referring to FIG. 5, FIG. 5 is a schematic diagram of a retrieval result page according to some embodiments. For example, in the information retrieval method, pieces of first information 41 such as Info 2, Info 3, and Info 5 are displayed on a retrieval result page, and first index tag sub-sets 51 respectively corresponding to the pieces of first information 41 are displayed. The display contents may include, but not limited to, contents such as all or some texts or pictures of the first information 41 or the first index tag sub-set 51.

Figure 6:
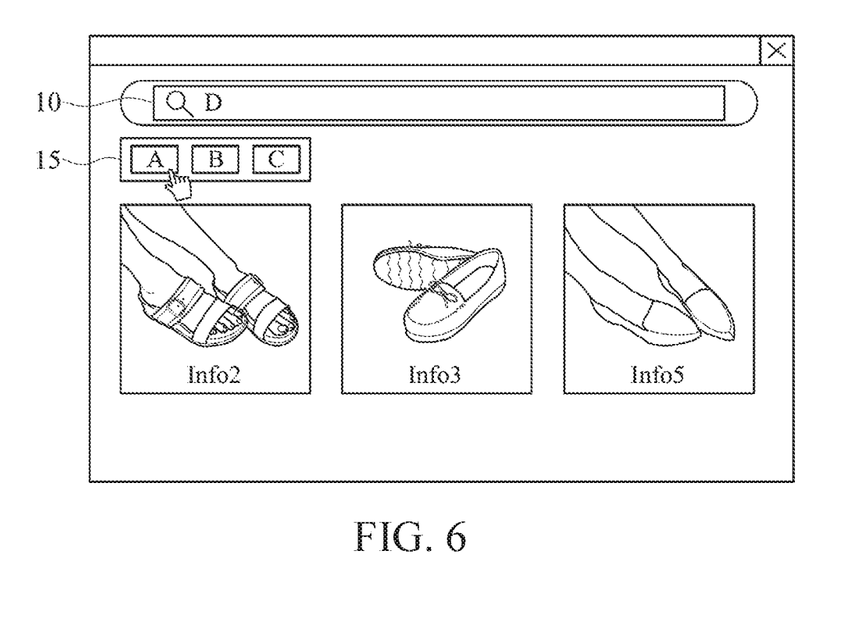
FIG. 6 is a schematic diagram of a retrieval result page in some conventional technologies.

Referring to FIG. 6, FIG. 6 is a schematic diagram of a retrieval result page in some conventional technologies. In the conventional technologies, a plurality of pieces of first information 41 and index tags 102 associated with the pieces of first information 41 are displayed. The index tags 102 are generated by collecting statistics on contents of all of the pieces of first information 41, so that a correspondence between each of the index tags 102 and each of the pieces of first information 41 is not explicit. In addition, the index tags 102 form a collective index tag total set 15. The index tag total set 15 is displayed in a specific region of a display screen. As a result, the user has no way of learning an association between a specific index tag 102 and a specific piece of first information 41. For example, "A" of the index tag 102 represents "Tod's shoes". A user well knowing various shoe styles and appearances may easily select Info 3 as the "Tod's shoes" from Info 2, Info 3, and Info 5 of the first information 41; however, when a user having no relevant background knowledge especially likes a shoe style of Info 3, and intends to further look for a similar shoe style, the user cannot determine whether the shoe style of Info 3 is "Tod's shoes" indicated by the index tag total set 15. Referring to FIG. 5, according to some embodiments, a display field of a first index tag sub-set 51 is adjacent to a display field of first information 41 corresponding to the first index tag sub-set 51. Therefore, in the foregoing example, the user may explicitly learn that "Tod's shoes" of A of the index tag 102 corresponds to a shoe style of Info 3 of the first information 41. According to some embodiments, the first index tag 511 is a reminder of a characteristic of the first information 41. For example, "C" of the index tag 102 represents "shoelace-free", and reminds a user paying attention to Info 5 of a characteristic that the user is likely to prefer.

In the information retrieval method, a second filter tag 7 is received. The second filter tag 7 is selected from any first index tag 511 in the first index tag sub-set 51. In the foregoing example, the user is interested in the characteristic A of Info 3 of the first information 41, and therefore selects "A" of the first index tag 511. "A" of the first index tag 511 is the second filter tag 7. According to some embodiments, a display instruction is transmitted in the information retrieval method, where the display instruction causes a display screen at a receiving end to display a clickable first index tag 511. After any first index tag 511 is clicked, the foregoing receiving end generates and transmits a click signal. In the information retrieval method, after the click signal is received, the second filter tag 7 is generated according to the clicked first index tag 511. According to some embodiments, the "click" may be performed through a mouse, a stylus, or a finger or in any directive manner, to select the first index tag 511. For example, referring to FIG. 5, a mouse is used for controlling a cursor 11 to select the first index tag 511.

Figure 7:
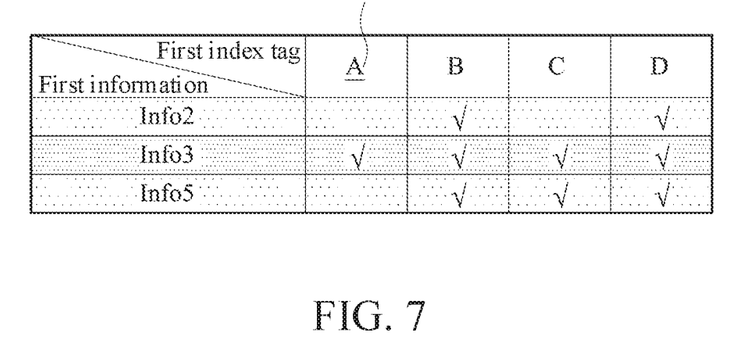
FIG. 7 is an information relationship diagram of a first information set according to some embodiments.
Figure 8:
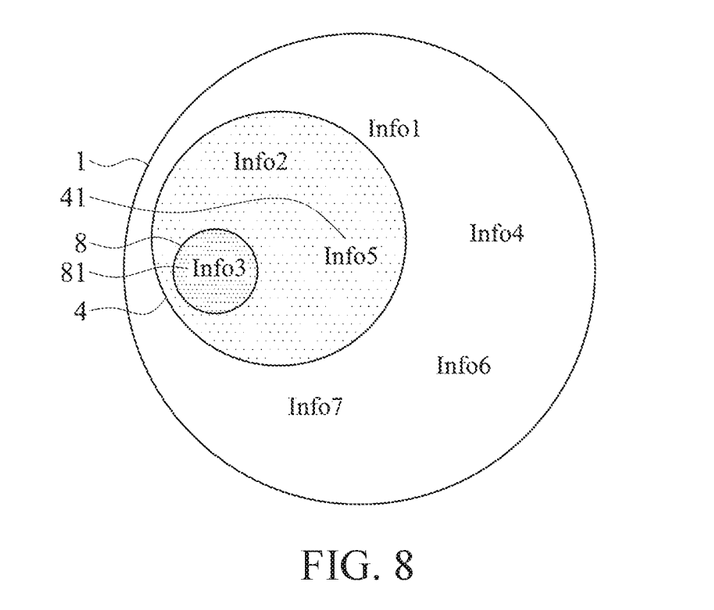
FIG. 8 is a schematic diagram of a second information set according to some embodiments.

In the information retrieval method, a plurality of pieces of first information 41 associated with the second filter tag 7 are extracted from the first information set 4. All of the pieces of first information 41 extracted in the information retrieval method are pieces of second information 81, and the pieces of second information 81 jointly form a second information set 8. Referring to FIG. 7 and FIG. 8 together, FIG. 7 is an information relationship diagram of a first information set according to some embodiments. FIG. 8 is a schematic diagram of a second information set according to some embodiments. For example, among Info 2, Info 3, and Info 5 of the first information set 4, "A" of a second filter tag 7 corresponds to only Info 3. In the information retrieval method, Info 3 of first information 41 is extracted, and Info 3 is defined as second information 81. Info 3 itself forms the second information set 8.

Figure 9:
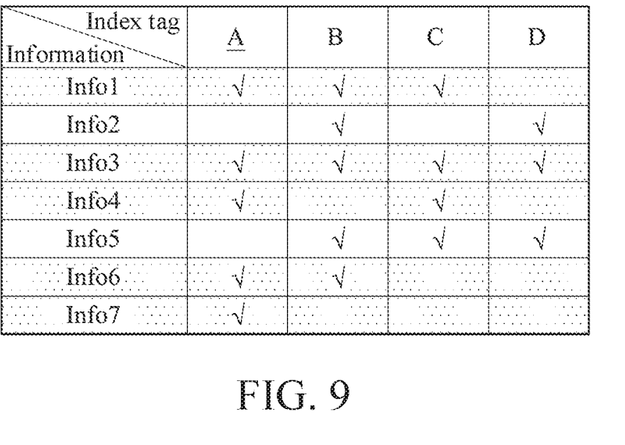
FIG. 9 is an information relationship diagram of a database in some conventional technologies.
Figure 10:
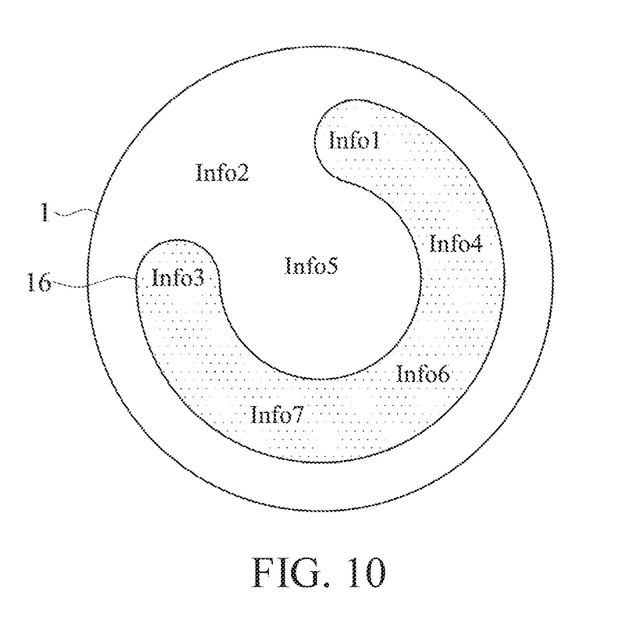
FIG. 10 is a schematic diagram of a retrieval result in some conventional technologies.

Referring to FIG. 9 and FIG. 10 together, FIG. 9 is an information relationship diagram of a database in some conventional technologies. FIG. 10 is a schematic diagram of a retrieval result in some conventional technologies. In the conventional technologies, after a second filter tag 7 is received, the second filter tag 7 is used to re-retrieve the entire range of a database 1. For example, "A" of the second filter tag 7 corresponds to Info 1, Info 3, Info 4, Info 6, and Info 7 of information 101 in the range of the database 1. The pieces of information 101 does not necessarily have an association with first information 41 retrieved by using a first filter tag 3, and a user has no way of learning which one of the pieces of information 101 has an association with the first information 41. Therefore, for the user, the second filter tag 7 does not provide a retrieval result 16 more convergent in a range of a first information set 4. Instead, the second filter tag 7 provides a group of retrieval results 16 totally different from those provided by the first filter tag 3. As a result, results of the retrieval process cannot converge.

Figure 11:
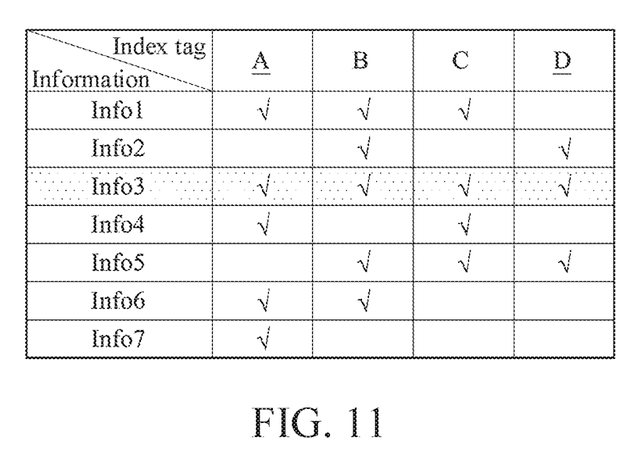
FIG. 11 is an information relationship diagram of a database in some other conventional technologies.
Figure 12:
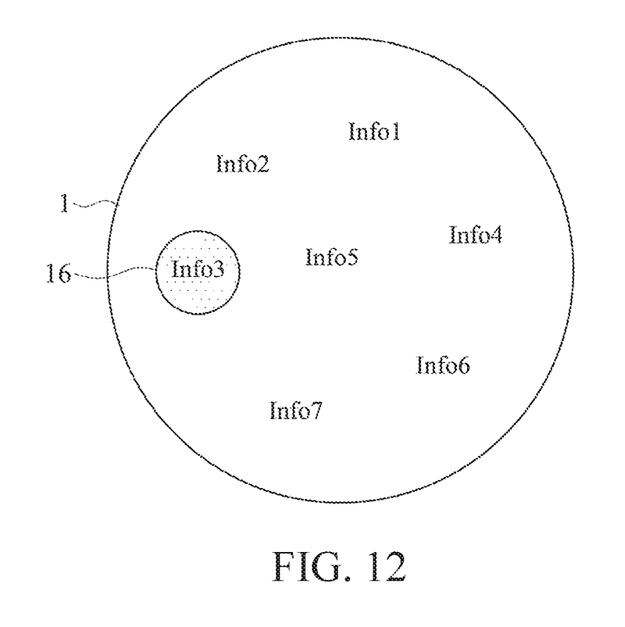
FIG. 12 is a schematic diagram of a retrieval result in some other conventional technologies.

Referring to FIG. 11 and FIG. 12 together, FIG. 11 is an information relationship diagram of a database in some other conventional technologies. FIG. 12 is a schematic diagram of a retrieval result in some other conventional technologies. In the some other conventional technologies, after a second filter tag 7 is received, an intersection set of a first filter tag 3 and the second filter tag 7 is used to re-retrieve the entire range of a database 1. In the method, a retrieval result 16 more convergent in a range of a first information set 4 can be obtained. However, in the method, retrieval comparison needs to be performed in the entire range of the database 1, which is not only time-consuming but also occupies a system operation amount. For example, referring to FIG. 7 and FIG. 11 together, a retrieval result 16 of Info 3 is obtained similarly, and three comparison steps for the pieces of first information 41 are performed in the embodiments in FIG. 7, while seven comparison steps for the pieces of information 101 would be performed in the conventional technologies in FIG. 11.

According to some embodiments, in the information retrieval method, after the second filter tag 7 is received, retrieval is performed in the range of the first information set 4 instead of the entire range of the database 1. According to some embodiments, after second information sets 8 associated with the second filter tag 7 are extracted from the range of the first information set 4 in the information retrieval method, the user is provided with a second index tag sub-set associated with the second information sets 8 in the information retrieval method. The user performs selection from the second index tag sub-set to obtain a third filter tag. Then, in the information retrieval method, a third information set associated with the third filter tag is extracted from the range of the second information set 8. By continuously repeating the same process, in the information retrieval method, the original search range converges from the database 1 to the first information set, the second information set, the third information set, the fourth information set, . . . , and so on, until the user stops retrieval or until all pieces of information in the information sets cannot be distinguished by the index tag 102 anymore.

According to some embodiments, the first index tag 511 may be, but not limited to, data such as a text or a picture. According to some embodiments, the second index tag or an index tag derived by repeating the information retrieval method may also be, but not limited to, data such as a text or a picture.

Figure 13:
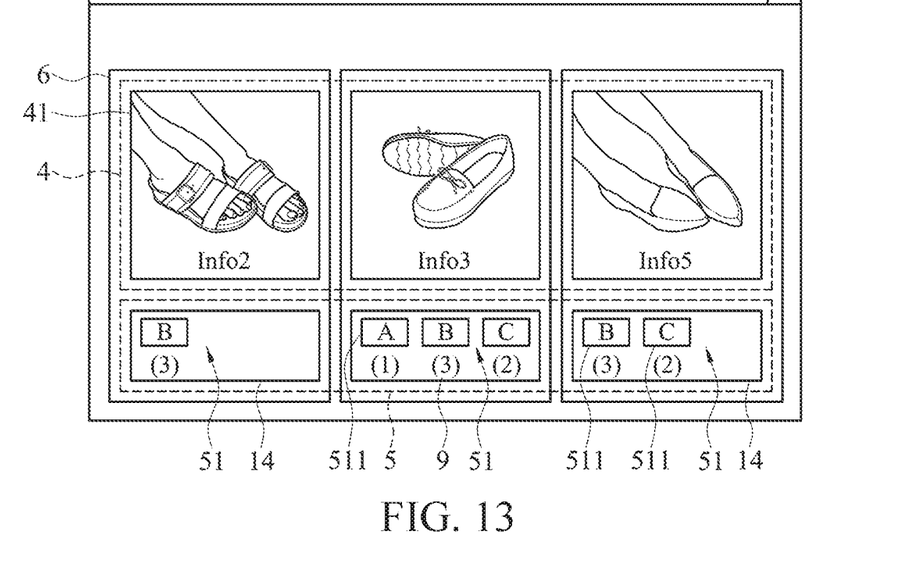
FIG. 13 is a schematic diagram of a set relationship of a retrieval result page according to some embodiments.

Referring to FIG. 13, FIG. 13 is a schematic diagram of a set relationship of a retrieval result page according to some embodiments. For example, "A" of the first index tag 511 is "Tod's shoes", "B" of the first index tag 511 is "flat", and "C" of the first index tag 511 is "shoelace-free". Therefore, through a correspondence between Info 3 of the first information 41 and "A" of the first index tag 511, the user may understand that the appearance of "Tod's shoes" looks like a shoe style presented by picture information of Info 3, and Info 2 and Info 5 do not have characteristics that "Tod's shoes" should have. Similarly, through a correspondence between Info 3 of the first information 41 and "C" of the first index tag 511, and a correspondence between Info 5 of the first information 41 and "C" of the first index tag 511, the user may understand that Info 3 and Info 5 have a characteristic of "shoelace-free", and may speculate that Info 2 should have a characteristic of "shoelace".

For example, the first index tag 511 "A" may be a cropped image of a toe cap part of Info 3 of the first information 41. Therefore, when the user prefers a toe cap characteristic of Info 3, but cannot describe the characteristic by using a text, the user may easily perform further retrieval by selecting A of the first index tag 511 through the correspondence between Info 3 of the first information 41 and "A" of the first index tag 511.

For example, "A" of the first index tag 511 may simultaneously provide keywords "Tod's shoes" and a cropped image of a toe cap part of Info 3 of the first information 41. Therefore, the user may understand that a shoe style having the characteristic of the toe cap part of Info 3 is "Tod's shoes".

According to some embodiments, in the step of displaying the first index tag sub-set 51 in the information retrieval method, only first index tags 511 corresponding to at least two pieces of first information 41 are displayed. For example, referring to FIG. 13, "A" of the first index tag 511 corresponds to only Info 3 of the first information 41, so that "A" of the first index tag 511 is not displayed. The reason is that the characteristic implied by "A" of the first index tag 511 can be used for distinguishing only one piece of first information 41, that is, Info 3. According to some embodiments, in the step of displaying the first index tag sub-set 51 in the information retrieval method, the first index tags 511 corresponding to all of the pieces of first information 41 in the first information set 4 are not displayed. For example, referring to FIG. 13, "B" of the first index tag 511 corresponds to all pieces of first information 41, so that "B" of the first index tag 511 is not displayed. The reason is that the characteristic implied by "B" of the first index tag 511 cannot be used for further filter out the first information set 4.

Referring to FIG. 13, according to some embodiments, an information quantity 9 is displayed in the information retrieval method. The information quantity 9 is adjacent to the first index tag 511. The information quantity 9 is a quantity of first information 41 having the same first index tag 511 in the first information set 4. According to some embodiments, the information quantity 9 provides a basis on which whether the user selects the first index tag 511 as the second filter tag 7. For example, when the user intends to quickly obtain a convergent retrieval result, selecting a first index tag 511 corresponding to a relatively large information quantity 9 is unhelpful for achieving an objective of the user. The reason is that using the first index tag 511 as the second filter tag 7 is to obtain second information 81 whose quantity is the same as the information quantity 9. According to some embodiments, in the information retrieval method, whether to display the first index tag 511 is decided according to the magnitude of the information quantity 9 corresponding to the first index tag 511. For example, the first index tag 511 corresponding to the relatively large information quantity 9, that is, a first index tag 511 whose filter capability is relatively poor is not displayed.

Referring to FIG. 13, according to some embodiments, a retrieval result page displayed in the information retrieval method may include one first information set 4 and one first index tag total sub-set 5. The first information set 4 includes a plurality of pieces of first information 41; the first index tag total sub-set 5 includes a plurality of first index tag sub-sets 51; and the first index tag sub-set 51 includes at least one first index tag 511. The pieces of first information 41 and a plurality of first index tag sub-set 51 corresponding to one of the pieces of first information 41 form a plurality of first information-tag sets 6. Compared with the conventional technologies in which the first index tag total sub-set 5 is provided in only a specific region of a retrieval result page. According to some embodiments, a plurality of first information-tag sets 6 are provided in the information retrieval method, to cause the user to learn an association between the first information 41 and the first index tag sub-set 51. According to some embodiments, referring to FIG. 13, a display field 14 of the first index tag sub-set is adjacent to or located in a display field or display page of first information 41 corresponding to the first index tag sub-set 51, to cause the user to easily learn that the first information 41 has an association with the first index tag sub-set 51 corresponding to the first information.

According to some embodiments, a display field 14 of a first index tag sub-set is adjacent to a display field of first information 41 corresponding to the first index tag sub-set 51. According to some embodiments, "adjacent" may mean that a distance between specific first information 41 and a display field 14 of a first index tag sub-set corresponding to the specific first information is less than a distance between the first information 41 and a display field 14 of another first index tag sub-set. The "distance" may be, but not limited to, a shortest distance, a longest distance or a distance between two geometric center points. Referring to FIG. 13, for example, a shortest distance between Info 2 of first information 41 and a first index tag sub-set 51 (including only "B" of the first index tag 511) corresponding to the first information is less than a shortest distance between Info 2 of the first information 41 and another first index tag sub-set 51 (including "A", "B", and "C" of the first index tag 511); and is also less than a shortest distance between Info 2 of the first information 41 and another first index tag sub-set 51 (including only "B" and "C" of the first index tag 511).

Figure 14A:
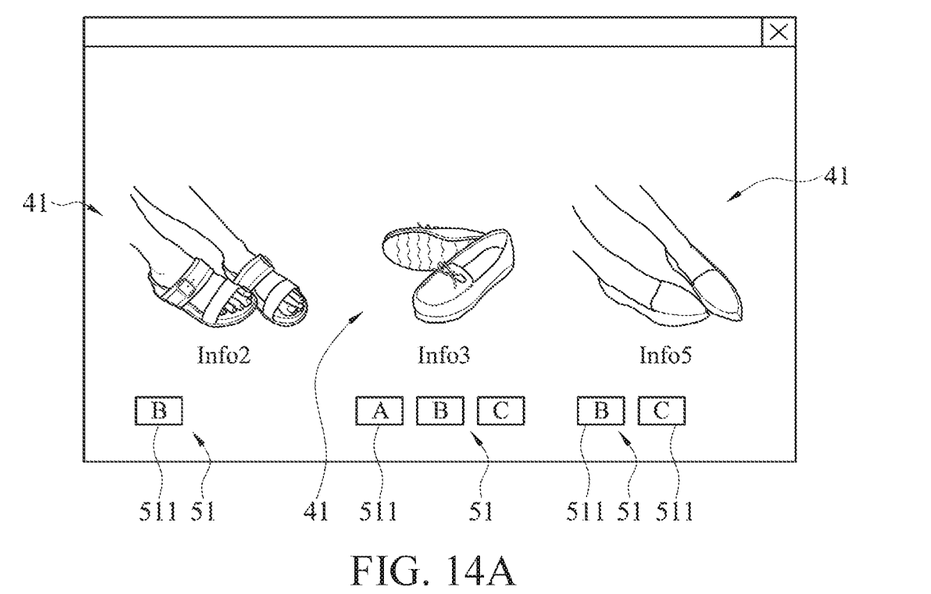
FIG. 14A is a schematic diagram of a display field of a first index tag sub-set according to a first embodiment.
Figure 14B:
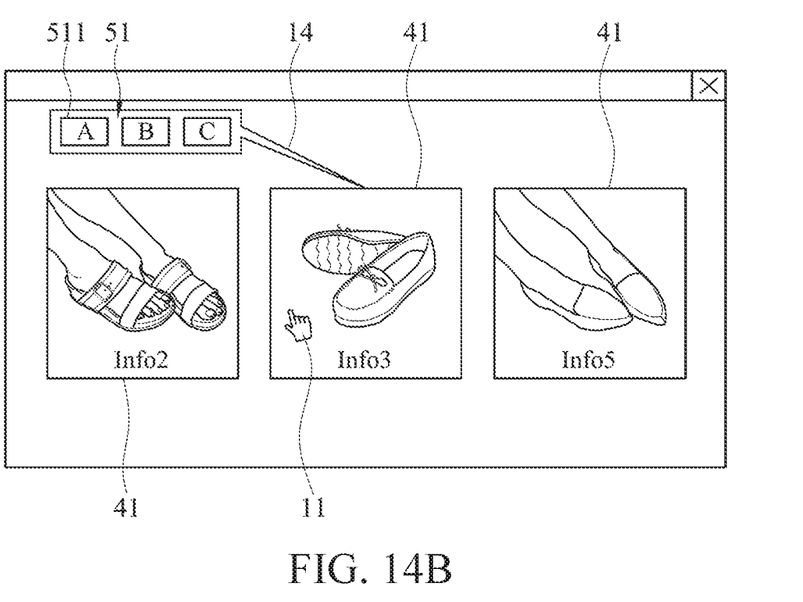
FIG. 14B is a schematic diagram of a display field of a first index tag sub-set according to a second embodiment.

According to some embodiments, a display field may be, but not limited to, a wire frame, a color block, or a fixed margin, so that included information contents are distinguished from the surrounding. Referring to FIG. 14A, FIG. 14A is a schematic diagram of a display field of a first index tag sub-set according to a first embodiment. For example, a margin distance between Info 2 of first information 41 and a first index tag sub-set 51 (including only "B" of the first index tag 511) corresponding to the first information is equal to a margin distance between Info 3 of the first information 41 and a first index tag sub-set 51 (including "A", "B", and "C" of the first index tag 511) corresponding to the first information. Regularity is generated by using a fixed margin, to cause the user to learn an association between the first information 41 and the first index tag sub-set 51 corresponding to the first information. According to some embodiments, the display field may be a field including information contents or an extension of a field. According to some embodiments, the "extension" may be performed in a manner of, but not limited to, a connecting line, a field frame, or a field color block, so that a field extends to be adjacent to another field. Referring to FIG. 14B, FIG. 14B is a schematic diagram of a display field of a first index tag sub-set according to a second embodiment. For example, the display field of the first index tag sub-set 51 (including "A", "B", and "C" of the first index tag 511) extends, by using a field frame, to a place beside Info 3 of first information 41 corresponding to the first index tag sub-set. Therefore, a shortest distance between the field frame of the display field of the first index tag sub-set 51 (including "A", "B", and "C" of the first index tag 511) and Info 3 of the first information 41 corresponding to the first index tag sub-set is less than a shortest distance between the field frame of the display field of the first index tag sub-set 51 (including "A", "B", and "C" of the first index tag 511) and other first information 41.

Figure 14C:
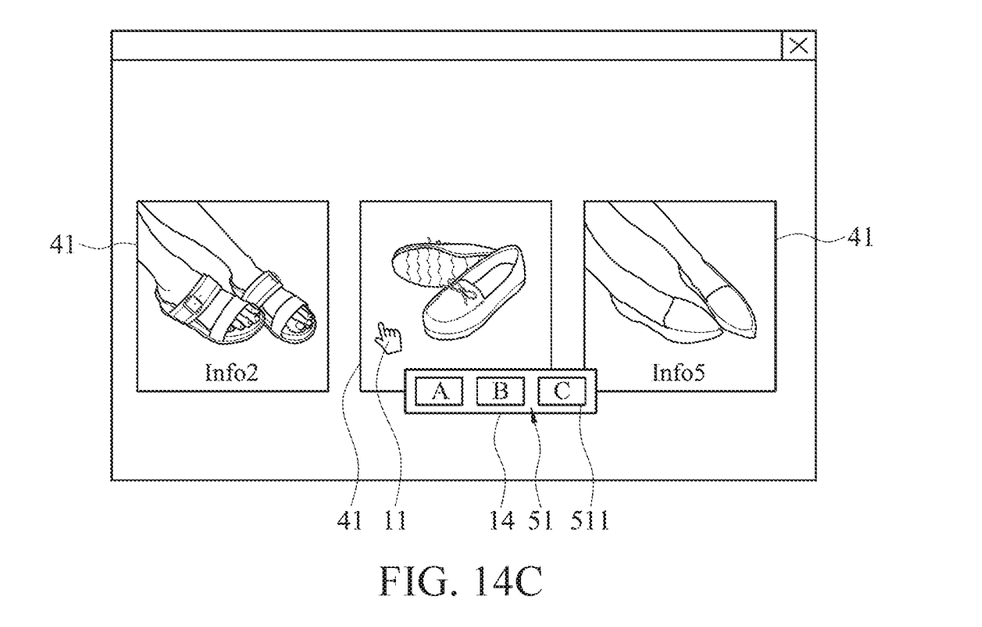
FIG. 14C is a schematic diagram of a display field of a first index tag sub-set according to a third embodiment.

According to some embodiments, "adjacent" may mean that, for specific first information 41, only a first index tag sub-set 51 corresponding to the specific first information is displayed, and meanwhile other first index tag sub-sets 51 are not displayed. Because only the specific first information 41 and the first index tag sub-set 51 corresponding to the specific first information exist at the same time, a distance between the two is shortest and is unique. For example, according to some embodiments, a display field of first information 41 is selected, and then a display field 14 of a first index tag sub-set corresponding to the first information 41 is displayed. Referring to FIG. 14C, FIG. 14C is a schematic diagram of a display field of a first index tag sub-set according to a third embodiment. In the third embodiment, a user moves a cursor 11 onto first information 41, to display a display field 14 of the first index tag sub-set corresponding to the first information. Because only the first information 41 and the first index tag sub-set 51 corresponding to the first information are displayed, such case that a distance between another first index tag sub-set 51 and the first information 41 is less than a distance between the first information 41 and the first index tag sub-set 51 corresponding to the first information does not established. According to some embodiments, the "select" may be to click a first index tag 511. According to some embodiments, the "select" may be to move the cursor 11 onto the display field of the first information 41.

Figure 14D:
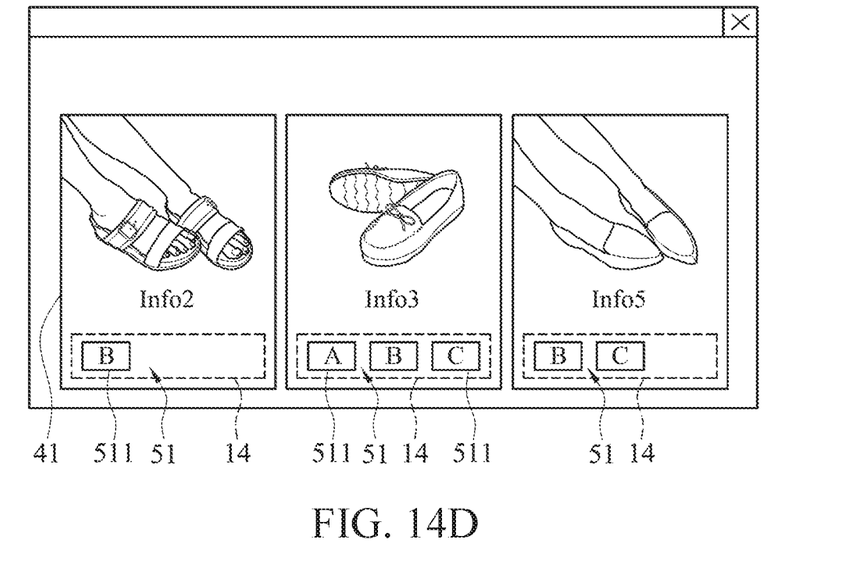
FIG. 14D is a schematic diagram of a display field of a first index tag sub-set according to a fourth embodiment.

According to some embodiments, a display field 14 of a first index tag sub-set is located in a display field of first information 41 corresponding to a first index tag sub-set 51. Referring to FIG. 14D, FIG. 14D is a schematic diagram of a display field of a first index tag sub-set according to a fourth embodiment. For example, a first index tag sub-set 51 (including "A", "B", and "C" of the first index tag 511) corresponding to Info 3 of the first information 41 is displayed in a field frame of a display field of Info 3 of the first information 41.

Figure 14E:
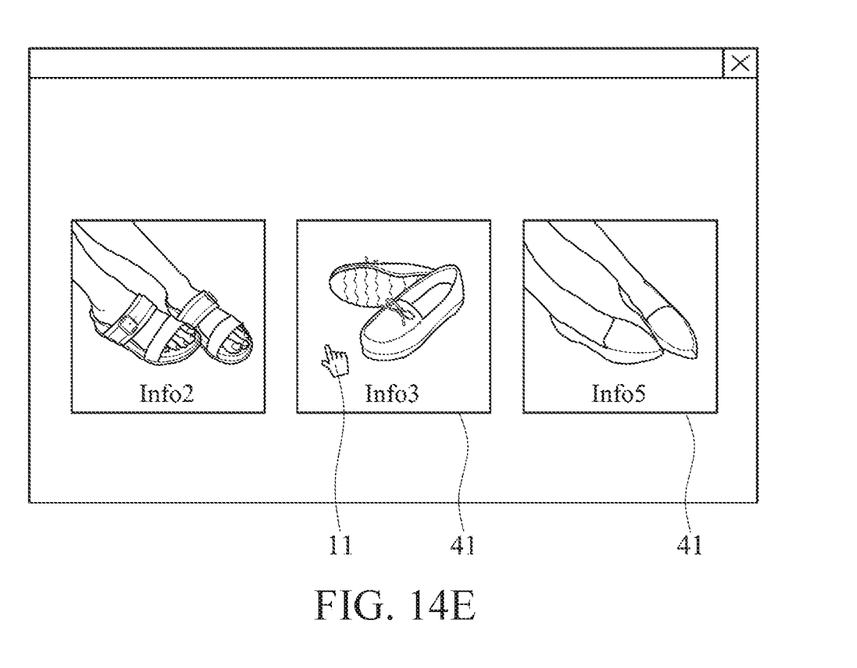
FIG. 14E is a schematic diagram of selecting first information according to some embodiments.
Figure 14F:
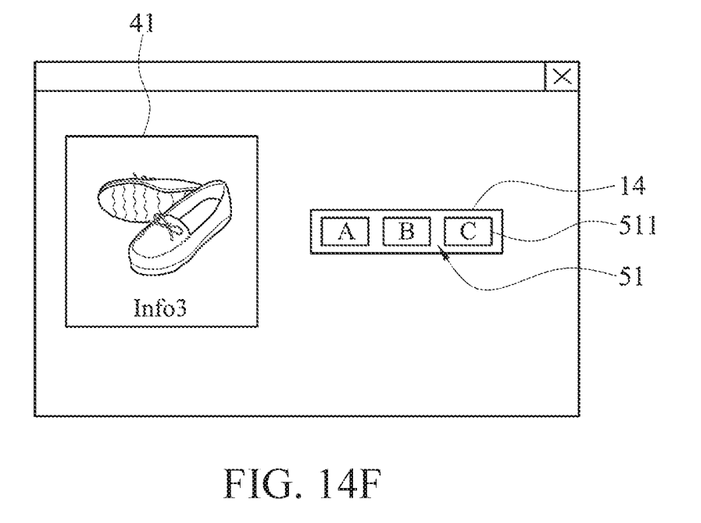
FIG. 14F is a schematic diagram of a display page of a first index tag sub-set according to some embodiments.

According to some embodiments, a display field 14 of a first index tag sub-set is located in a display page of first information 41 corresponding to a first index tag sub-set 51. Referring to FIG. 14E and FIG. 14F together, FIG. 14E is a schematic diagram of selecting first information according to some embodiments. FIG. 14F is a schematic diagram of a display page of a first index tag sub-set according to some embodiments. For example, a user clicks Info 3 of the first information 41 by using a cursor 11, or moves the cursor 11 onto Info 3 of the first information 41, to display a display page of the first information 41 (FIG. 14F). A display field 14 of the first index tag sub-set corresponding to Info 3 of the first information 41 is located in the display page.

Figure 15A:
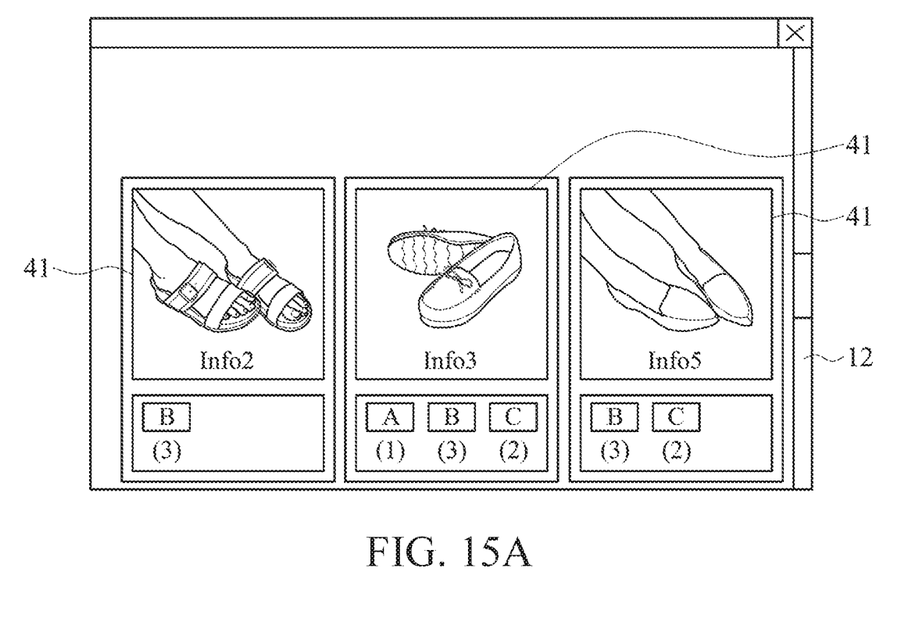
FIG. 15A is a schematic diagram of a display window with a scroll according to some embodiments.
Figure 15B:
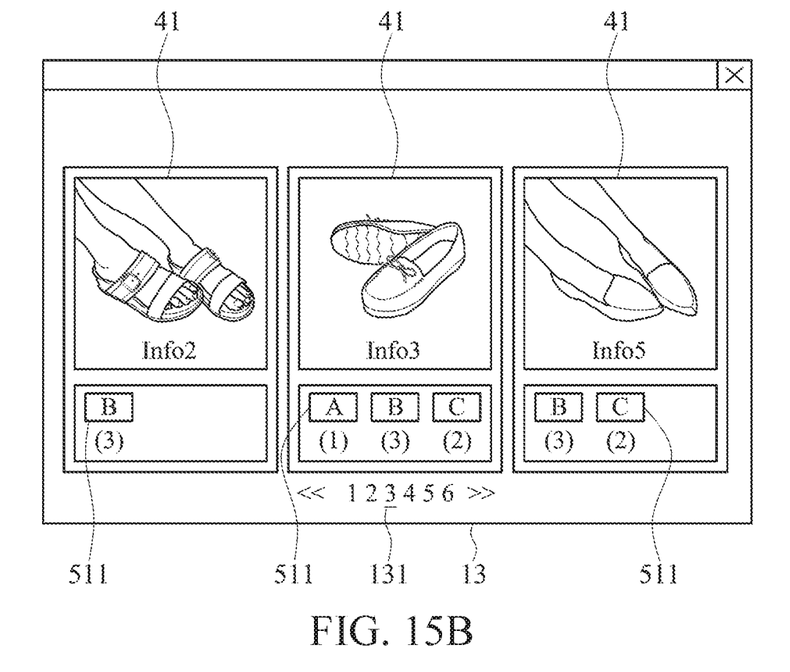
FIG. 15B is a schematic diagram of a display page according to some embodiments.

According to some embodiments, before the step of extracting the index tag 102, the information retrieval method further includes receiving window information. According to some embodiments, after the window information is received in the information retrieval method, first information 41 currently displayed on a user side could be learned according to the window information. The "window information" may be, but not limited to, a location of a scroll 12 of a web page or a page number 131 of the paged page 13. For example, referring to FIG. 15A, FIG. 15A is a schematic diagram of a display window with a scroll according to some embodiments. According to some embodiments, a client transmits a coordinate of a scroll 12 to a server, so that pieces of first information 41 such as Info 2, Info 3, and Info 5 currently displayed on the client are learned by the information retrieval method that is executed on the server. For example, referring to FIG. 15B, FIG. 15B is a schematic diagram of a display page according to some embodiments. According to some embodiments, a client transmits a page number 131 of a paged page 13 to a server, so that it is learned by the information retrieval method executed on the server that a page currently displayed on the client is a display page including pieces of first information 41 such as Info 2, Info 3, and Info 5. According to some embodiments, in the information retrieval method, after the window information is received, a first index tag 511 corresponding to first information 41 displayed on the user side is extracted. Therefore, the user is prevented from feeling a delay of system computation in operations.

Figure 16:
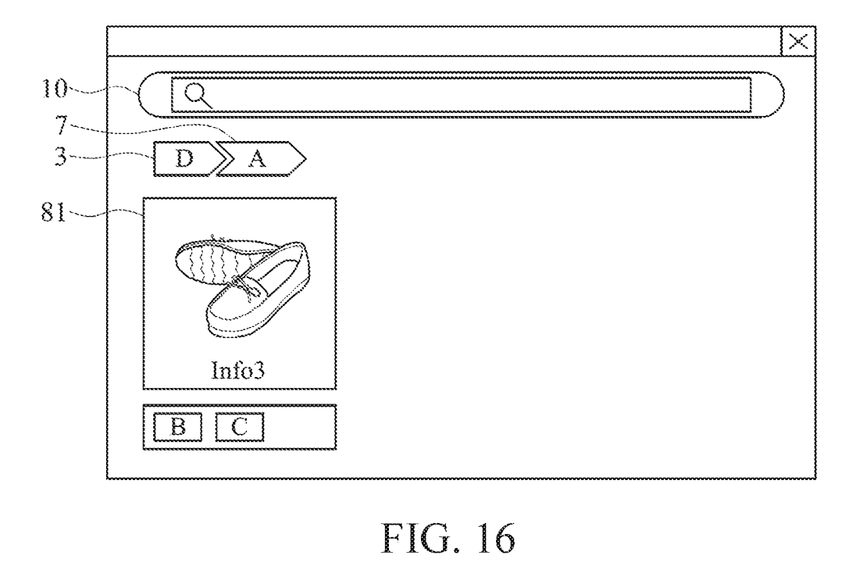
FIG. 16 is a schematic diagram of a retrieval result page according to some other embodiments.

To generate the second information 81, in the information retrieval method, the first information set 4 is screened out from the database 1 by using the first filter tag 3, and then the second information set 8 is screened out from the first information set 4. Therefore, a second information set 8 corresponds to a first filter tag 3 and a second filter tag 7 for screening out the second information set. Referring to FIG. 16, FIG. 16 is a schematic diagram of a retrieval result page according to some other embodiments. According to some embodiments, in the information retrieval method, the first filter tag 3 and the second filter tag 7 corresponding to the pieces of second information 81 are displayed. Therefore, the user learns common characteristics that all of the pieces of second information 81 of the second information set 8 have. According to some embodiments, in the information retrieval method, the first filter tag 3, the second filter tag 7 and the third filter tag corresponding to the pieces of third information are displayed.

According to some embodiments, a display sequence of a plurality of first index tags 511 of the first index tag sub-set 51 may be decided by using a condition such as pageviews, an information publication time, or an information association degree, or a combination of more than one of the foregoing conditions. For example, a first index tag 511 whose pageviews is relatively high is displayed before a first index tag 511 whose pageviews rate is relatively low is displayed.

What is claimed is:

1. An information retrieval method, applicable to a database, wherein the database comprises a plurality of pieces of information and a plurality of index tags, each of the pieces of information is associated with at least one of the index tags, and the information retrieval method comprises:

receiving a piece of retrieval information;

determining an index tag associated with the retrieval information, wherein the associated index tag is a first filter tag;

extracting a plurality of pieces of first information associated with the first filter tag from the pieces of information of the database, wherein the pieces of first information form a first information set;

extracting a plurality of first index tags corresponding to the pieces of first information from the index tags, wherein the first index tags form a first index tag set;

defining a first index tag sub-set, wherein the first index tag sub-set does not comprise the first filter tag;

displaying the pieces of first information;

displaying the first index tag sub-sets, wherein a display field of each of the first index tag sub-sets is adjacent to or located in a display field or display page of first information corresponding to the first index tag sub-set; wherein a distance between the display field of one piece of first information and the display field of one of the first index tag sub-sets which is corresponding to the one piece of first information is less than a distance between the display field of the one piece of first information and a display field of another first index tag sub-set which is not corresponding to the one piece of first information;

receiving a second filter tag, wherein the second filter tag is selected from any first index tag in the first index tag sub-set; and extracting a plurality of pieces of second information associated with the second filter tag from the pieces of first information of the first information set, wherein the pieces of second information form a second information set.

2. The information retrieval method according to claim 1, further comprising:

extracting a plurality of second index tags corresponding to the pieces of second information from the index tags, wherein the second index tags form a second index tag set;

defining a second index tag sub-set, wherein the second index tag sub-set does not comprise the first filter tag or the second filter tag;

displaying the pieces of second information;

displaying the second index tag sub-sets, wherein a display field of each of the second index tag sub-sets is adjacent to or located in a display field or display page of second information corresponding to the second index tag sub-set;

receiving a third filter tag, wherein the third filter tag is selected from any second index tag in the second index tag sub-set; and extracting a plurality of pieces of third information associated with the third filter tag from the pieces of second information of the second information set, wherein the pieces of third information form a third information set.

3. The information retrieval method according to claim 1, wherein the first index tag is a text, a picture or a combination thereof.

4. The information retrieval method according to claim 1, wherein the first index tags corresponding to the pieces of first information are clickable, and the method further comprises:

receiving a click signal, wherein the click signal is generated by clicking the first index tag; and generating the second filter tag according to the clicked first index tag.

5. The information retrieval method according to claim 1, wherein in the step of displaying the first index tag sub-set, only first index tags corresponding to at least two pieces of first information are displayed.

6. The information retrieval method according to claim 5, wherein in the step of displaying the first index tag sub-set, the first index tags corresponding to all of the pieces of first information in the first information set are not displayed.

7. The information retrieval method according to claim 5, further comprising: displaying an information quantity near the first index tag, wherein the information quantity is a quantity of first information having the same first index tag in the first information set.

8. The information retrieval method according to claim 1, further comprising: receiving a selection of a display field of each of the pieces of first information, and then displaying a display field of a first index tag sub-set corresponding to the first information.

9. The information retrieval method according to claim 1, further comprising: receiving a piece of window information before the step of extracting the index tags, wherein the window information is a reminder of the pieces of first information displayed on a client; and the step of extracting the index tags further comprises: extracting the first index tag set formed by the first index tags corresponding to the pieces of first information displayed on the client.

10. The information retrieval method according to claim 1, further comprising: displaying the first filter tag and the second filter tag corresponding to the pieces of second information.

11. The information retrieval method according to claim 1, wherein a display sequence of the first index tags of the first index tag sub-set is decided based on a condition selected from a group formed by a click-through rate, an information publication time, an information association degree and a combination thereof.

\* \* \* \* \*